United States Patent
Cai et al.

(10) Patent No.: US 10,691,238 B2
(45) Date of Patent: Jun. 23, 2020

(54) ARRAY SUBSTRATE AND TOUCH CONTROL DISPLAY PANEL

(71) Applicant: Xiamen Tianma Micro-Electronics Co., Ltd., Xiamen (CN)

(72) Inventors: Shoujin Cai, Xiamen (CN); Xiaoxiao Wu, Xiamen (CN); Bingping Liu, Xiamen (CN); Xiai Xu, Xiamen (CN); Guozhao Chen, Xiamen (CN)

(73) Assignee: XIAMEN TIANMA MICRO-ELECTRONICS CO., LTD., Xiamen (CN)

(*) Notice: Subject to any disclaimer, the term of this patent is extended or adjusted under 35 U.S.C. 154(b) by 236 days.

(21) Appl. No.: 15/810,787

(22) Filed: Nov. 13, 2017

(65) Prior Publication Data

US 2018/0067599 A1  Mar. 8, 2018

(30) Foreign Application Priority Data

Jun. 29, 2017  (CN) .......................... 2017 1 0516363

(51) Int. Cl.
  *G06F 3/041*  (2006.01)
  *G06F 3/044*  (2006.01)

(52) U.S. Cl.
  CPC ............ *G06F 3/0412* (2013.01); *G06F 3/044* (2013.01); *G06F 3/0416* (2013.01); *G06F 2203/04107* (2013.01)

(58) Field of Classification Search
  CPC . G06F 3/04; G06F 3/041; G06F 3/045; G06F 3/044; G01R 27/26
  See application file for complete search history.

(56) References Cited

U.S. PATENT DOCUMENTS

| 2015/0084887 | A1* | 3/2015 | Kuo ..................... G06F 1/1643 345/173 |
| 2016/0209959 | A1* | 7/2016 | Lee ......................... G06F 3/044 |
| 2016/0291710 | A1* | 10/2016 | Kang .................... G06F 3/0487 |
| 2016/0291754 | A1* | 10/2016 | Jin ........................ G06F 3/0412 |
| 2018/0107330 | A1* | 4/2018 | Meng ..................... G06F 3/044 |
| 2018/0307368 | A1* | 10/2018 | Koide .................. H01L 27/124 |
| 2019/0004645 | A1* | 1/2019 | Wang .................. G02F 1/13338 |

FOREIGN PATENT DOCUMENTS

CN  105242814 A  1/2016

* cited by examiner

*Primary Examiner* — Pegeman Karimi
(74) *Attorney, Agent, or Firm* — Anova Law Group PLLC (57) ABSTRACT

An array substrate and a touch control display panel are provided. The array substrate comprises a display area and a non-display area surrounding the display area; a plurality of touch control electrodes comprising a plurality of first touch control electrodes and a plurality of second touch control electrodes; and a plurality of touch control signal lines. A first touch control electrode is disposed only in the display area. A second touch control electrode includes a first portion disposed in the display area and a second portion disposed in the non-display area. A ratio m between an area of the first portion of the second touch control electrode and an area of the first touch control electrode is configured to be approximately $0.067 \leq m \leq 0.65$. A touch control electrode is electrically connected to at least one of the plurality of touch control signal lines.

20 Claims, 7 Drawing Sheets

ARRAY SUBSTRATE AND TOUCH CONTROL DISPLAY PANEL

CROSS-REFERENCES TO RELATED APPLICATIONS

This application claims the priority of Chinese Patent Application No. CN 201710516363.4, filed on Jun. 29, 2017, the entire contents of which are incorporated herein by reference.

FIELD OF THE DISCLOSURE

The present disclosure generally relates to the display technology and, more particularly, relates to an array substrate and a touch control display panel thereof.

BACKGROUND

With the rapid development of display technology, touch control display technology has gradually spread throughout people's daily lives. Among existing touch resistive-type touch control display panels, as compared to resistive touch control display panels, capacitive touch control display panels are featured with long lifetime, high transmittance, and multi-touch control capability, etc., which have become a hot topic of touch control display technology. Meanwhile, to meet various user demands, touch control display devices are often installed with a functional module such as a camera.

An existing touch control display panel often includes an array substrate which is disposed with a plurality of touch control electrodes for sensing an external touch. When a functional module such as a camera is going to be installed on a touch control display device comprising the touch control display panel, arc-shaped chamfers for embedding the functional module such as the camera have to be configured on the array substrate. As a result, the touch control electrode disposed at the edge of the arc-shaped chamfer has a smaller area than touch control electrodes disposed in regions other than the edge of the arc-shaped chamfer. In particular, when the area of the touch control electrode disposed at the edge of the arc-shaped chamfer is substantially small, a corresponding received touch control scanning signal may be substantially, degrading the touch control sensitivity at the arc-shaped chamfer of the touch control display panel.

The disclosed array substrate and touch control display panel thereof are directed to solve one or more problems set forth above and other problems.

BRIEF SUMMARY OF THE DISCLOSURE

One aspect of the present disclosure provides an array substrate. The array substrate comprises a display area and a non-display area surrounding the display area; a plurality of touch control electrodes comprising a plurality of first touch control electrodes and a plurality of second touch control electrodes; and a plurality of touch control signal lines. A first touch control electrode is disposed only in the display area. A second touch control electrode includes a first portion disposed in the display area and a second portion disposed in the non-display area. A ratio m between an area of the first portion of the second touch control electrode and an area of the first touch control electrode is configured to be approximately $0.067 \leq m \leq 0.65$. A touch control electrode is electrically connected to at least one of the plurality of touch control signal lines.

Another aspect of the present disclosure provides a touch control display panel comprising an array substrate. The array substrate comprises a display area and a non-display area surrounding the display area; a plurality of touch control electrodes comprising a plurality of first touch control electrodes and a plurality of second touch control electrodes; and a plurality of touch control signal lines. A first touch control electrode is disposed only in the display area. A second touch control electrode includes a first portion disposed in the display area and a second portion disposed in the non-display area. A ratio m between an area of the first portion of the second touch control electrode and an area of the first touch control electrode is configured to be approximately $0.067 \leq m \leq 0.65$. A touch control electrode is electrically connected to at least one of the plurality of touch control signal lines.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Figure 1:
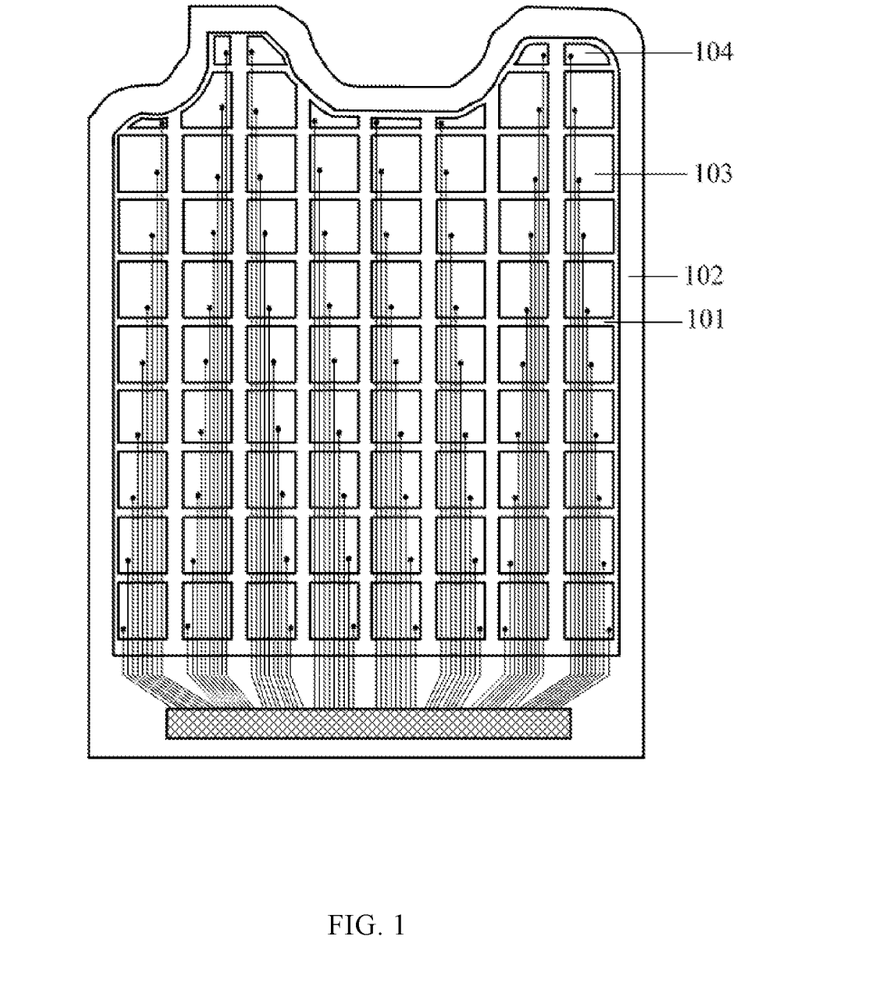
FIG. 1 illustrates a schematic top view of an existing array substrate.

FIG. 1 illustrates a schematic top view of an existing array substrate. As shown in FIG. 1, the array substrate includes a display area 101 and a non-display area 102 surrounding the display area 101. The display area 101 is provided with a plurality of touch control electrodes for sensing an external touch. However, when a functional module such as a camera is going to be installed on a touch control display device comprising the touch control display panel, arc-shaped chamfers for embedding the functional module such as the camera have to be configured on the array substrate. As a result, the plurality of touch control electrodes on the array substrate can be categorized into a second touch control electrode 104 disposed at the edge of the arc-shaped chamfer, and first control electrodes 103 disposed in regions other than the edge of the arc-shaped chamfer.

As shown in FIG. 1, the second touch control electrode 104 is partially missing as compared to the first control touch control electrode 103 and, thus, the second touch control electrode 104 disposed at the edge of the arc-shaped chamfer often has a smaller area than the first touch control electrode 103. When the area of the second touch control electrode 104 is smaller than a preset value, the second touch control electrode 104 may receive a substantially weak touch control scanning signal, degrading the touch control sensitivity at the arc-shaped chamfer of the touch control display panel.

The present disclosure provides an array substrate and a touch control display panel with an improved touch control sensitivity.

Figure 2:
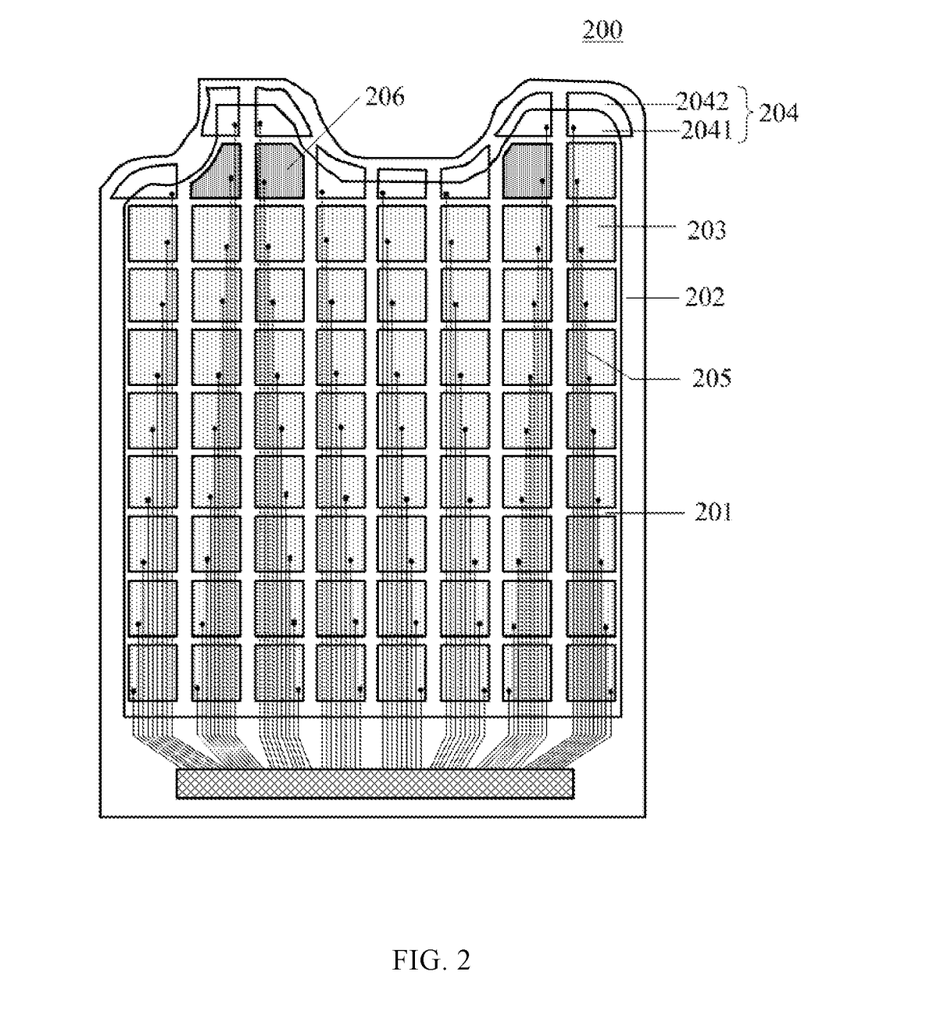
FIG. 2 illustrates a schematic top view of an exemplary array substrate consistent with disclosed embodiments.

FIG. 2 illustrates a schematic top view of an exemplary array substrate 200 consistent with disclosed embodiments. As shown in FIG. 2, the array substrate 200 may include a display area 201 and a non-display area 202 surrounding the display area 201. The array substrate 200 may include a plurality of touch control electrodes and a plurality of touch control signal lines 205.

The array substrate 200 may have an irregular shape, for example, at least one edge of the array substrate 200 may have an arc-shaped chamfer for embedding a functional module such as a camera. The plurality of touch control electrodes in the array substrate 200 may include a plurality of first touch control electrodes 203 and a plurality of second touch control electrodes 204. The first touch control electrodes 203 may be disposed only in the display area 201. Each second touch control electrode 204 may include a first portion 2041 and a second portion 2042. The first portion 2041 of the second touch control electrode 204 may be disposed in the display area 201, and the second portion 2042 of the second touch control electrode 204 may be disposed in the non-display area 202.

In particular, the first portion 2041 of the second touch control electrode 204 may be only disposed in the display area 201, and the second portion 2042 of the second touch control electrode 204 may be disposed only in the non-display area 202. That is, the first portion 2041 of the second touch control electrode 204 may not be disposed outside the display area 201, and the second portion 2042 of the second touch control electrode 204 may not disposed outside the non-display area 202.

Further, the first touch control electrodes 203 may have various shapes according to various application scenarios. In one embodiment, as shown in FIG. 2, the first touch control electrode 203 may have a rectangular shape, and the second touch control electrode 204 may be an irregular-shaped touch control electrode disposed along the arc-shaped chamfer of the array substrate 200. The ratio between the area of the first portion 2041 of the second touch control electrode 204 and the area of the first touch control electrode 203 is m, which may be determined according to various application scenarios. In one embodiment, m may be configured to be approximately $0.067 \leq m \leq 0.65$. That is, the area of the first portion 2041 of the second touch control electrode 204 may be smaller than the area of the first touch control electrode 201, in which the first portion 2041 may be disposed only in the display region 201.

In the array substrate of the existing touch control display panel, the second touch control electrode 204 only includes the first portion 2041 disposed in the display area 201, the touch control scanning signal received by the second touch control electrode 204 may be substantially weak/small, degrading the touch control sensitivity at the region where the second touch control electrode 204 is disposed.

In the disclosed embodiments, each second touch control electrode 204 may include not only the first portion 2041 disposed in the display area 201 but also the second portion 2042 disposed in the non-display area 202 and, thus, compared to the second touch control electrode 204 only including the first portion 2041 disposed in the display area 201, the area of the second touch control electrode 204 may be significantly increased. Accordingly, the touch control scanning signal received by the second touch control electrode 204 may be significantly enhanced, improving the touch control sensitivity of the touch control display panel comprising the array substrate.

In certain embodiments, the array substrate may have a regular shape. Similar to the array substrate having the irregular shape, through increasing the area of the touch control electrode disposed at the edge of the display area in the array substrate, the touch control electrode disposed at the edge of the display area in the array substrate may be configured to include a first portion disposed in the display area and a second portion disposed in the non-display area. Accordingly, the touch control scanning signal received by the touch control electrode disposed at the edge of the display area in the array substrate may also be significantly enhanced, improving the touch control sensitivity of the display panel which includes the array substrate.

In practical applications, the array substrate may have a regular shape or an irregular shape, which may be determined according to different application scenarios.

Further, the array substrate 200 may also include a plurality of third touch control electrodes 206. Similar to the second touch control electrode 204, the third touch control electrode 206 may also be an irregular-shaped touch control electrode disposed along the arc-shaped chamfer of the array substrate 200. However, different from the second touch control electrode 204, the third touch control electrode 206 may be disposed only in the display area 201 and, meanwhile, the area of the third touch control electrode 206 may be greater than the area of the first portion 2041 of the second touch control electrode 204.

In one embodiment, in the array substrate 200, the ratio between the area of the third touch control electrode 206 and the area of the first touch control electrode 203 may be greater than 0.65. Then the touch control scanning signal received by the third touch control electrode 206 may not be much different from the touch control scanning signal received by the first touch control electrode 203 in terms of signal intensity, without degrading the touch control sensitivity of the display panel which comprising the array substrate. Thus, the third touch control electrode 206 may be configured to be disposed only in the display area 201, and may not have to extend to the non-display area 202 to increase the area of the third touch control electrode 206.

In the disclosed embodiments, the first touch control electrode 203 and the second touch control electrode 204 each may be electrically connected to at least one touch control signal line 205. The touch control signal line 205 may be electrically connected to a touch chip or the like, to provide a touch control scanning signal to the electrically connected first touch control electrode 203 or the electrically connected second touch control electrode 204. The touch control signal line 205 may also output a touch control sensing signal to the electrically connected first touch control electrode 203 or the electrically connected second touch control electrode 204. The touch control sensing signal may be used to determine the location of the touch control electrode where a touch operation occurs.

In addition, when the array substrate 200 includes the third touch control electrode 206, the array substrate 200 may also include touch control signal line 205 electrically connected to the third touch control electrode 206, and the touch control signal line 205 may provide the touch control scanning signal to the electrically connected third touch control electrode 206.

In the disclosed embodiments, the array substrate 200 may include the first touch control electrodes 203 and the second touch control electrodes 204. The first touch control electrodes 203 may be disposed only in the display area 201. The second touch control electrode 204 may include the first portion 2041 disposed in the display area 201 and the second portion 2042 disposed in the non-display area 202. At least one touch control signal line 205 electrically connected to each touch control electrode may provide a touch control scanning signal to a corresponding touch control electrode.

Further, the ratio m between the area of the first portion 2041 of the second touch control electrode 204 and the area of the first touch control electrode 203 may be configured to satisfy $0.067 \leq m \leq 0.65$. Compared to the second touch control electrode 204 which only includes the first portion 2041 disposed in the display area 201, through introducing the second portion 2042 disposed in the non-display area 202 to the second touch control electrode 204, the area difference between the second touch control electrode 204 and the first touch control electrode 203 may be reduced.

On the other hand, both the first portion 2041 and the second portion 2042 of the second touch control electrode 204 may receive the touch control scanning signal. Thus, the second touch control electrode 204, which includes both the first portion 2041 disposed in the display area 201 and the second portion 2042 disposed in the non-display area 202, may receive an enhanced touch control scanning signal. Accordingly, the touch control sensitivity of the touch control display panel which comprises the array substrate 200 may be improved.

Figure 3:
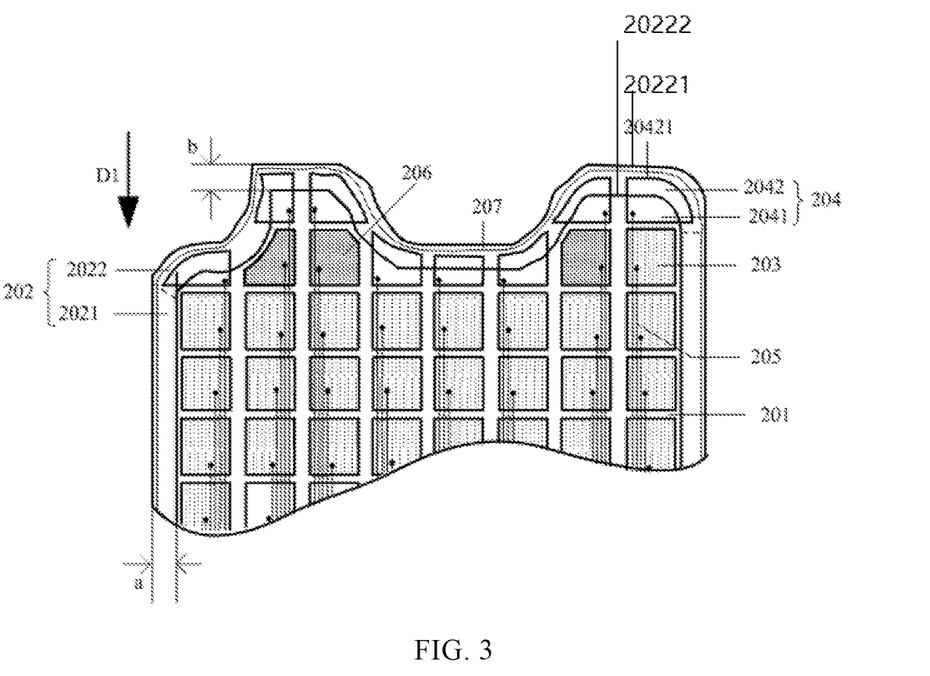
FIG. 3 illustrates a partial top view of another exemplary array substrate consistent with disclosed embodiments.

FIG. 3 illustrates a partial top view of another exemplary array substrate consistent with disclosed embodiments. The similarities between FIG. 2 and FIG. 3 are not repeated here, while certain difference may be explained.

As shown in FIG. 3, the non-display area 202 in the array substrate 200 may surround the display area 201. Each second touch control electrode 204 may be disposed close to the edge/border of the array substrate 200, for example, close to the edge of the non-display area 202 of the array substrate 200. In one embodiment, the first touch control electrode 203 may be disposed close to the edge/border of the array substrate 200, for example, close to the edge of the display area 201 of the array substrate 200. In another embodiment, the first touch control electrode 203 may be disclosed approximately at the center of the array substrate 200, and arranged in an array.

In one embodiment, as shown in FIG. 3, the non-display area 202 may include a first non-display area 2021 and a second non-display area 2022. In particular, the first non-display area 2021 may be arranged close to the first touch control electrode 203, and the second portion 2042 of the second touch control electrode 204 may be disposed in the second non-display area 2022. Further, the boundary line of the first non-display area 2021 and the display area 201 may have a distance of a to the edge of the array substrate 200 close to the first non-display area 2021. That is, the width of the first non-display area 2021 may be a. The boundary line of the second non-display area 2022 and the display area 201 may have a distance of b to the edge of the array substrate 200 close to the second non-display area 2022. That is, the width of the second non-display area 2022 may be b. In particular, the width a of the first non-display area 2021 and the width b of the second non-display area 2022 may be configured to satisfy a<b. That is, the width b of the second non-display area 2022 may be larger than the width a of the first non-display area 2021.

Through configuring the width b of the second non-display area 2022 to be larger than the width a of the first non-display area 2021, the second portion 2042 of the second touch control electrode 204 may be configured to have a substantially large area in the second non-display area 2022, such that the area of the second touch control electrode 204 may be increased. Accordingly, the touch control scanning signal received by the second touch control electrode 204 may be enhanced, and the touch control sensitivity of the touch control display panel in which the array substrate 200 is disposed may be improved.

Figure 9:
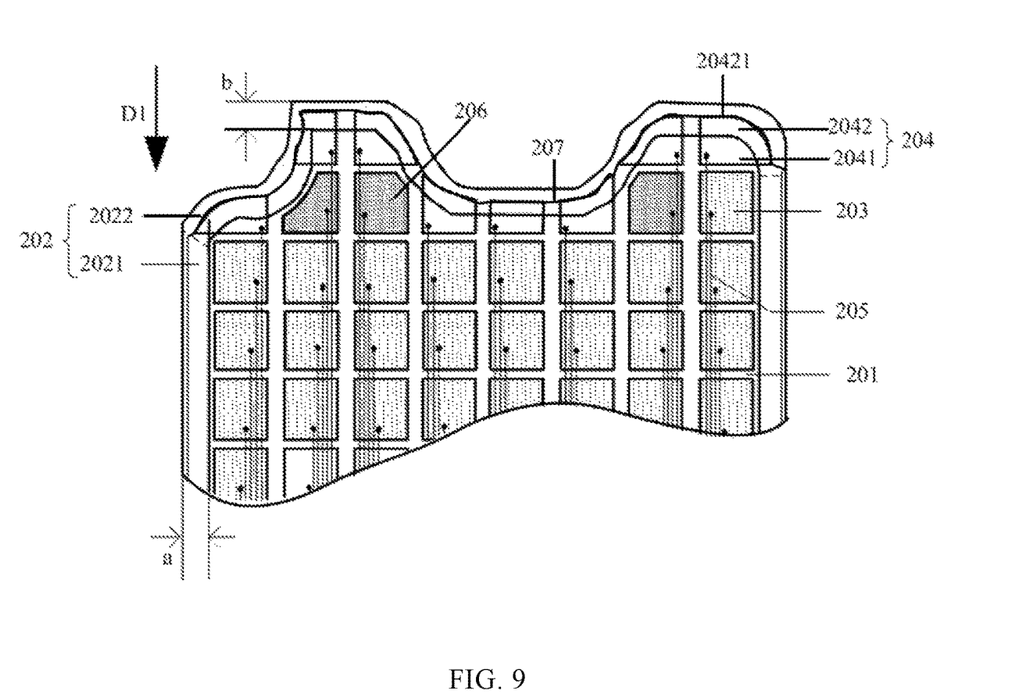
FIG. 9 illustrates a partial top view of another exemplary array substrate consistent with disclosed embodiments.

Further, as shown in FIG. 3, the array substrate 200 may also include a ground wire 207 disposed in the non-display area 202. The array substrate 200 may further include a base substrate, on which the touch control electrodes, the touch control signal lines 205, and the ground wire 207 may be disposed. In one embodiment, as shown in FIG. 3, when being projected onto the base substrate, the orthogonal projection of the ground wire 207 may be disposed between the edge of the array substrate 200 and the orthogonal projection of the second touch control electrode 204. In another embodiment, as shown in FIG. 9, when being projected onto the base substrate, the orthogonal projection of the ground wire 207 may overlap with the orthogonal projection of an edge 20421 of the second touch control electrode 204, in which the edge 20421 of the second touch control electrode 204 is arranged in the non-display area 202. That is, the second portion 2041 of the second touch control electrode 204 may not extend beyond the ground wire 207.

Referring to FIG. 3 and FIG. 9, the ground wire 207 may prevent the external electrostatic charges from entering the array substrate 200. When the second portion 2041 of the second touch control electrode 204 does not extend beyond the ground wire 207, the external electrostatic charges may be prevented from entering the array substrate 200 through the second portion 2041 of the second touch control electrode 204, thereby ensuring the image performance of the touch control display panel comprising the array substrate 200.

In one embodiment, as shown in FIG. 3, each second touch control electrode 204 may have a first edge 20421 disposed in the second non-display area 2022. The first edge 20421 may also be the edge of the second portion 2042 of the second touch control electrode 204, and the first edge 20421 may be far away from the display area 201. The first edge 20421 of the second touch control electrode 204 may be completely disposed in the second non-display area 2022.

Further, the second non-display region 2022 may have a first edge 20222 close to the display area 201 and a second edge 20221 far away from the display area 201. The first edge 20421 of the second touch control electrode 204 may be parallel to the second edge 20221 of the second non-display region 2022, as FIG. 3 shows. Thus, the second portion 2042 of the second touch control electrode 204 may have a further increased area in the second non-display area 2022 and, accordingly, the touch control sensitivity of the touch control display panel comprising the array substrate 200 may be further improved.

It should be noted that, the first edge 20421 of the second touch control electrode 204 may be strictly parallel to the second edge 20221 of the second non-display region 2022, or the first edge 20421 of the second touch control electrode 204 may be substantially parallel to the second edge 20221 of the second non-display region 2022, as FIG. 3 shows. Whether the first edge 20421 of the second touch control electrode 204 is strictly parallel or substantially parallel to the second edge 20221 of the second non-display region 2022 may be determined by various factors, such as the fabrication technologies of the array substrate, and the structure of the array substrate, etc.

Further, the ground wire 207 may also be arranged parallel to the second edge 20221 of the second non-display region 2022. Thus, external electrostatic charges may be prevented from entering the array substrate through the second touch control electrode 204 and, meanwhile, the area of the second portion 2042 of the second touch control electrode 204 may be increased.

The ratio between the area of any one of the second touch control electrodes 204 to the area of the first touch control electrode 203 is n. In one embodiment, the ratio n between the area of any one of the second touch control electrodes 204 and the area of the first touch control electrode 203 may be configured to be approximately $0.32 < n < 0.85$.

That is, the area difference between the second touch control electrode 204 (including the first portion 2041 and the second portion 2042) and the first touch control electrode 203 of the regular shape may be substantially small, thereby reducing the intensity difference among the touch control scanning signal received by the respective touch control electrodes, and ensuring the touch control sensitivity of the touch control display panel. Compared to the existing array substrate, in the disclosed array substrate the area difference between the first touch control electrode 204 and the second touch control electrode 204 may be further reduced, and the touch control sensitivity of the disclosed touch control display panel may be further improved.

In the disclosed embodiments, the width of the second non-display area 2022 where the second portion 2042 of the second touch control electrode 204 is disposed may be configured to be larger than the width of the first non-display area 2021, such that the area of the second touch control electrode 204 may be increased, and the area difference between the second touch control electrode 204 and the first touch control electrode 203 may be reduced. Accordingly, the touch control sensitivity of the touch control display panel comprising the array substrate 200 may be increased. In addition, the edge of the second touch control electrode 204 may not extend beyond the ground wire 207, such that the external electrostatic charge may be prevented from entering the array substrate 200, and the image performance of the touch control display panel may be improved.

Figure 6:
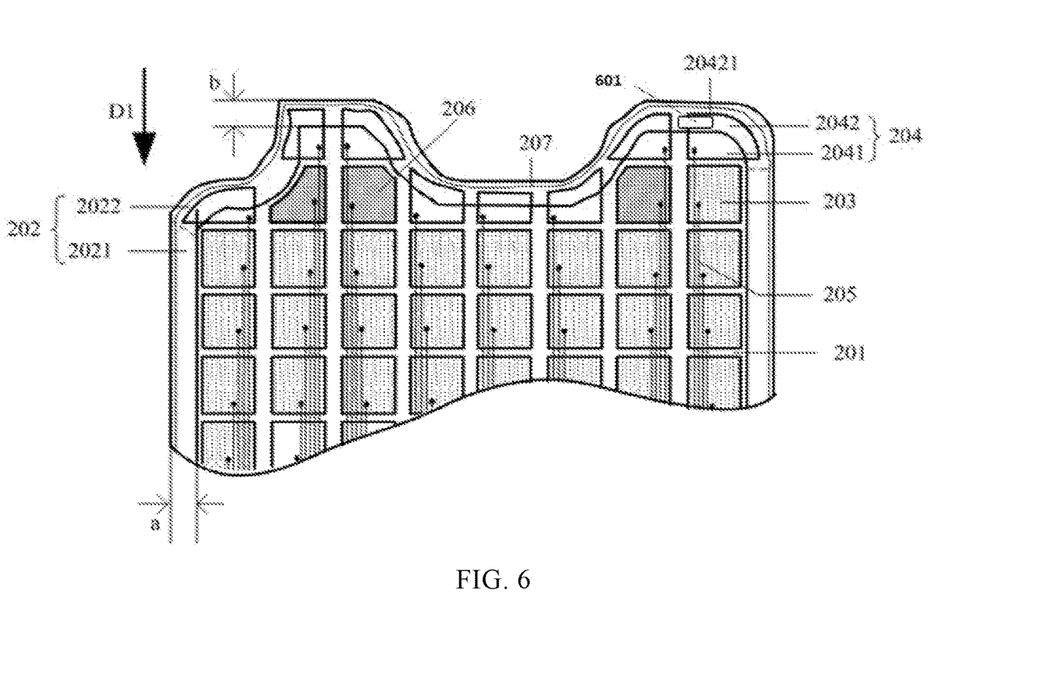
FIG. 6 illustrates a partial top view of another exemplary array substrate consistent with disclosed embodiments.

FIG. 6 illustrates an exemplary touch control display panel consistent with disclosed embodiments. The similarities between FIG. 6 and FIG. 3 are not repeated here, while certain difference may be explained.

As shown in FIG. 6, the array substrate 200 may further include at least one shift register area 601 located in the non-display area 202. The shift register area 601 may be used to dispose a plurality of cascaded shift registers, which may row by row provide a scanning signal to a plurality of row of pixel electrodes (i.e., pixel electrode rows) in the touch control display panel comprising the array substrate 200. Then the data lines in the touch control display panel may row by row supply data signals to the pixel electrode rows.

The shift register area 601 for disposing the shift registers may be arranged in the second non-display area 2022, and the ground line 207 and the shift register area 601 may be sequentially arranged along a first direction D1 as shown in FIG. 6. Thus, in a direction perpendicular to the surface of the array substrate 200, the second portion 2042 of the second touch control electrode 204 may at least partially overlap with the shift register area 601. That is, when being projected onto the base substrate of the array substrate, the orthogonal projection of the second portion 2042 of the second touch control electrode 204 may at least partially overlap with the orthogonal projection of the shift register area 601.

It should be noted that, when the touch control display panel is operated in a touch control stage, the driving chip may provide a touch control scanning signal to the corresponding touch control electrode through the touch control signal line 205, such that each touch control electrode may be configured to have a certain electrical potential. Further, during the touch control stage, each cascaded shift register may temporarily stop outputting the scanning signal to the corresponding next pixel electrode row and, thus, the electrical potential of the trigger signal of each cascade shift register may remain unchanged, i.e., the trigger signal may not have a transition between the high and low potentials. Thus, each shift register may not affect the electrical potential of the second touch control electrode 204, which at least partially overlaps with the shift register in the direction perpendicular to the surface of the array substrate 200.

Figure 7:
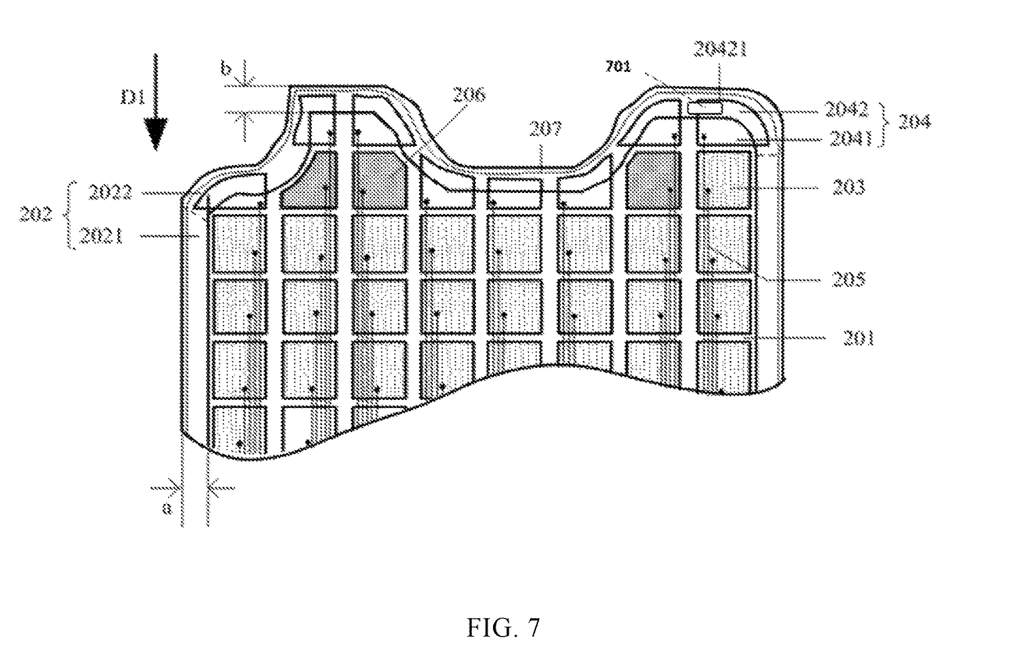
FIG. 7 illustrates a partial top view of another exemplary array substrate consistent with disclosed embodiments.

FIG. 7 illustrates an exemplary touch control display panel consistent with disclosed embodiments. The similarities between FIG. 7 and FIG. 3 are not repeated here, while certain difference may be explained.

As shown in FIG. 7, the array substrate 200 may also include an electrostatic protection device area 701 disposed in the non-display area 202, which may be used to dispose a plurality of electrostatic protection devices. Each electrostatic protection device may be electrically connected to a data line, guiding the electrostatic charges accumulated inside the array substrate 200 or injected from outside the array substrate 200 to be released. Accordingly, pixel units inside the display panel may be prevented from being damaged by the electrostatic discharge.

The electrostatic protection device area 701 for disposing the electrostatic protection devices may be arranged in the second non-display area 2022, and the ground line 207 and the electrostatic protection device area 701 may be sequentially arranged along the first direction D1 as shown in FIG. 7. Thus, in the direction perpendicular to the surface of the array substrate 200, the second portion 2042 of the second touch control electrode 204 may at least partially overlap with the electrostatic protection device area 701. That is, when being projected onto the base substrate of the array substrate, the orthogonal projection of the second portion 2042 of the second touch control electrode 204 may at least partially overlap with the orthogonal projection of the electrostatic protection device area 701.

The distance from the electrostatic protection device area 701 to the display area 201 is often several hundred micrometers. Thus, through configuring the orthogonal projection of the second portion 2042 of the second touch control electrode 204 to be at least partially overlapped with the orthogonal projection of the electrostatic protection device area 701, the area of the second touch control electrode 204 may be sufficiently large, and each electrostatic protection device may not affect the potential of the second touch control electrode 204.

Figure 8:
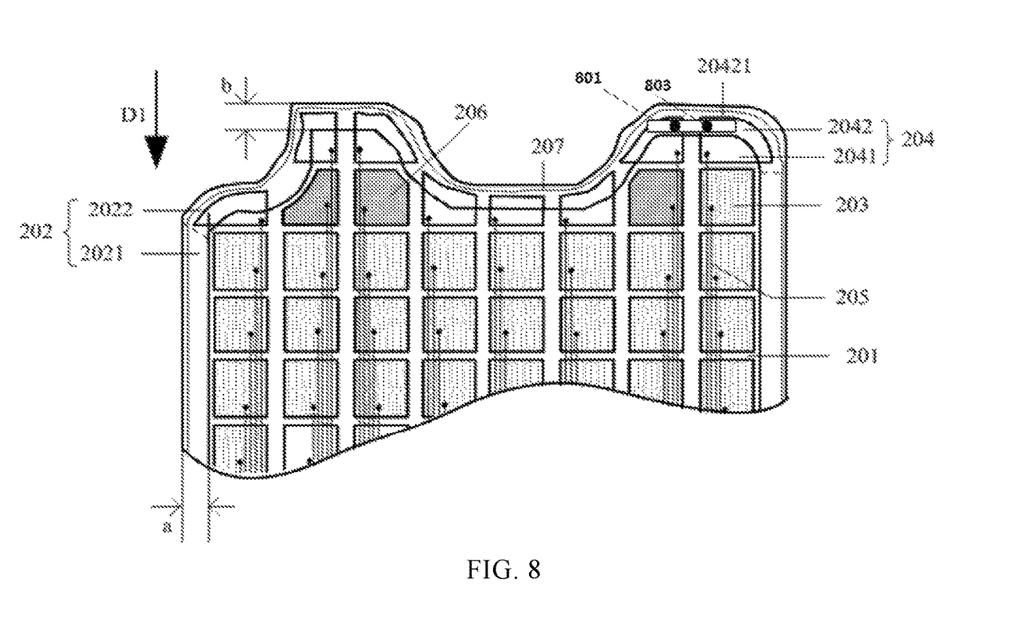
FIG. 8 illustrates a partial top view of another exemplary array substrate consistent with disclosed embodiments.

FIG. 8 illustrates an exemplary touch control display panel consistent with disclosed embodiments. The similarities between FIG. 8 and FIG. 3 are not repeated here, while certain difference may be explained.

As shown in FIG. 8, the array substrate 200 may also include a common electrode. The touch control display panel comprising the array substrate may be operated at a display stage and a touch control stage. At the display stage, the common electrode may receive a common voltage signal, which may work with the data signal on the pixel electrode to control the rotation of the liquid crystal molecular in the touch control display panel, such that the touch control display panel may be controlled to display predetermined pictures. Further, the common electrode may be multiplexed as a touch control electrode, such that the common electrode may be used as a touch control electrode at the touch stage to receive the touch control scanning signal from each touch control signal line 205.

When the common electrode is multiplexed as the touch control electrode, the array substrate 200 may also include a plurality of signal switchers 803, which may switch the signal to be received by the common electrode. Thus, the common electrode may be able to receive the touch control scanning signal at the display stage, and receive the common voltage signal at the touch control stage.

Further, the signal switchers may be disposed in a common electrode switcher area 801. The common electrode switcher area 801 may be arranged in the non-display area 202 and, more particular, the common electrode switcher area 801 may be arranged in the second non-display area 2022. Thus, in the direction perpendicular to the surface of the array substrate 200, the second portion 2042 of the second touch control electrode 204 may at least partially overlap with the common electrode switcher area 801. That is, when being projected onto the base substrate of the array substrate, the orthogonal projection of the second portion 2042 of the second touch control electrode 204 may at least partially overlap with the orthogonal projection of the common electrode switcher area 801.

The distance from the common electrode switcher area 801 to the display area 201 may be sufficient to set the second portion 2042 of the second touch control electrode 204. Thus, through configuring the orthogonal projection of the second portion 2042 of the second touch control electrode 204 to be at least partially overlapped with the orthogonal projection of the common electrode switcher area 801, the area of the second touch control electrode 204 may be sufficiently large, and each signal switcher may not affect the electrical potential of the second touch control electrode 204.

The present disclosure also provides a touch control display panel.

Figure 5:
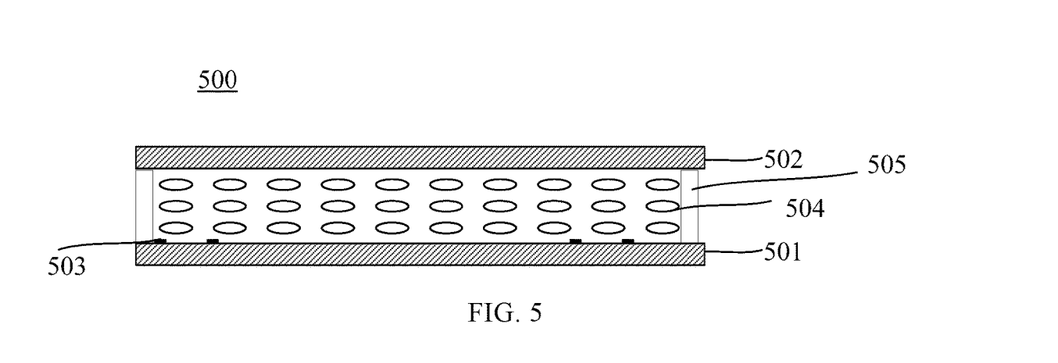
FIG. 5 illustrates a schematic cross-sectional view of an exemplary touch control display panel consistent with disclosed embodiments.

FIG. 5 illustrates schematic cross-sectional view of an exemplary touch control display panel 500 consistent with disclosed embodiments. As shown in FIG. 5, the touch control display panel 500 may comprise any one of the disclosed array substrate 501. The touch control display panel 500 may be a plasma touch control display panel, a field emission touch control display panel, a light-emitting diode (LED) touch control display panel, an organic light-emitting diode (OLED) touch control display panel, a liquid crystal touch control display panel, a quantum dots (QDs) touch control display panel, an electrophoretic touch control display panel, etc. Further, the touch control display panel may include any appropriate type of touch control display panels having both a display function and a touch control function.

In one embodiment, as shown in FIG. 5, the touch control display panel 500 may be a liquid crystal touch control display panel, which may further include a color film substrate 502, a plurality of thin film transistors 503 (TFTs) disposed on the array substrate 501, a flexible circuit board (not drawn in FIG. 5), a liquid crystal layer 504 sandwiched between the array substrate 501 and the color film substrate 502, and a plurality of spacers 505 for supporting the liquid crystal layer 504. The liquid crystal molecules in the liquid crystal layer 504 may rotate under an electric field generated between the pixel electrode and the common electrode, thereby displaying images.

In another embodiment, the touch control display panel may be an OLED touch control display panel, the touch control display panel may further include OLEDs disposed between the array substrate and a cover plate. The certain known structures are not explained in detail here. The touch control display panel 500 may also include other well-known structures, which are not explained here.

Figure 4:
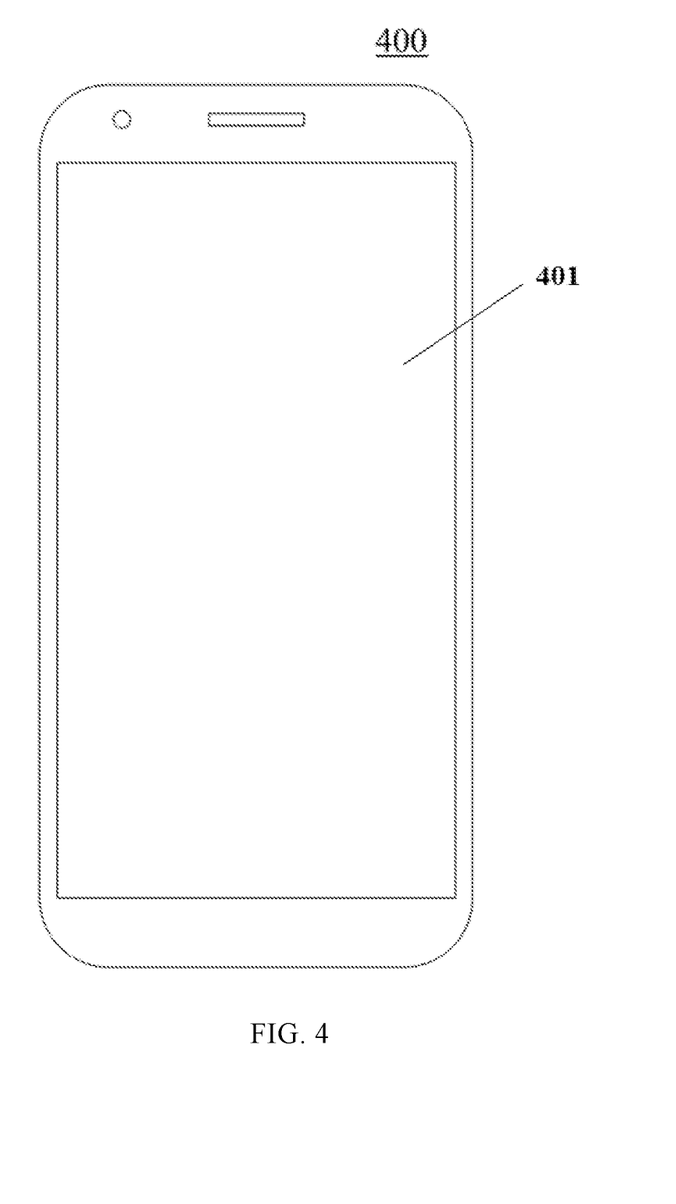
FIG. 4 illustrates an exemplary touch control display device consistent with disclosed embodiments.

The present disclosure also provides a touch control display device. FIG. 4 illustrates an exemplary touch control display panel 400 consistent with disclosed embodiments.

As shown in FIG. 4, the touch control display panel 400 may comprise any one of the disclosed touch control display panels 401. The touch control display device 400 may be a mobile phone having a touch control function, and the structure and function of the touch control display panel 401 in the touch control display device 400 are the same as any one of the disclosed touch control display panels 401, which will not be repeated here. The touch control display device 400 may also be a laptop, a television, a tablet, and a wearable smart device with a touch control function, etc.

In the disclosed embodiments, the array substrate and the touch control display panel may include a plurality of first touch control electrodes, a plurality of second touch control electrodes, and a plurality of touch control signal lines. The first touch control electrodes may be disposed only in the display area. The second touch control electrode may include a first portion disposed in the display area and a second portion disposed in the non-display area. At least one touch control signal line may be electrically connected to each touch control electrode to provide a touch control scanning signal to the corresponding touch control electrode.

Further, the ratio m between the area of the first portion of the second touch control electrode and the area of the first touch control electrode may be configured to satisfy $0.067 \leq m \leq 0.65$. Compared to the second touch control electrode which only includes the first portion disposed in the display area, through introducing the second portion, which is disposed in the non-display area, to the second touch control electrode, the area difference between the second touch control electrode 204 and the first touch control electrode 203 may be reduced.

On the other hand, both the first portion and the second portion of the block the second touch control electrode may receive the touch control scanning signal, such that the second touch control electrode, which includes both the first portion disposed in the display area and the second portion disposed in the non-display area, may receive an enhanced touch control scanning signal. Accordingly, the touch control sensitivity of the touch control display panel which comprises the array substrate may be improved.

Various embodiments have been described to illustrate the operation principles and exemplary implementations. It should be understood by those skilled in the art that the present invention is not limited to the specific embodiments described herein and that various other obvious changes, rearrangements, and substitutions will occur to those skilled in the art without departing from the scope of the invention. Thus, while the present invention has been described in detail with reference to the above described embodiments, the present invention is not limited to the above described embodiments, but may be embodied in other equivalent forms without departing from the scope of the present invention, which is determined by the appended claims.

What is claimed is:

1. An array substrate, comprising:
    a display area and a non-display area surrounding the display area, the non-display area including a first non-display area and a second non-display area;
    a plurality of touch control electrodes comprising a plurality of first touch control electrodes and a plurality of second touch control electrodes,
    wherein:
        a first touch control electrode is disposed only in the display area,
        the first non-display area is arranged along a first edge of the array substrate and close to the first touch control electrode,
        a second touch control electrode includes a first portion disposed in the display area and a second portion disposed in the second non-display area,
        the second non-display area is along a second edge of the array substrate,
        a distance from a boundary line between the first non-display area and the display area to the first edge of the array substrate is a, a distance from a boundary line between the second non-display area and the display area to the second edge of the array substrate is b, and a<b, and
        a ratio m between an area of the first portion of the second touch control electrode and an area of the first touch control electrode is configured to be approximately $0.067 \leq m \leq 0.65$; and
    a plurality of touch control signal lines, wherein a touch control electrode is electrically connected to at least one of the plurality of touch control signal lines.

2. The array substrate according to claim 1, wherein:
    an orthographic projection of the plurality of touch control signal lines on the array substrate is non-overlapped with one or more of the first non-display area and the second non-display area.

3. The array substrate according to claim 1, further including:
    a base substrate; and
    a ground wire be disposed in the non-display area,
    wherein when being projected onto the base substrate of the array substrate, an orthogonal projection of the ground wire is arranged between an edge of the array substrate and an orthogonal projection of the second touch control electrode.

4. The array substrate according to claim 1, further including:
    a base substrate; and
    a ground wire be disposed in the non-display area,
    wherein when being projected onto the base substrate of the array substrate, an orthogonal projection of the ground wire overlaps with an orthogonal projection of an edge of the second touch control electrode, and the edge of the second touch control electrode is in the non-display area.

5. The array substrate according to claim 1, further including:
    a base substrate; and
    at least one shift register area arranged in the non-display area for disposing a plurality of shift registers disposed,
    wherein when being projected onto the base substrate of the array substrate, an orthogonal projection of the second portion of the second touch control electrode at least partially overlaps with an orthogonal projection of the at least one shift register area.

6. The array substrate according to claim 1, further including:
    a base substrate; and
    an electrostatic protection device area arranged in the non-display area for disposing a plurality of electrostatic protection devices,
    wherein when being projected onto the base substrate of the array substrate, an orthogonal projection of the second portion of the second touch control electrode at least partially overlaps with an orthogonal projection of the electrostatic protection device area.

7. The array substrate according to claim 1, further including:
    a common electrode multiplex as the plurality of touch control electrodes,
    wherein the common electrode receives a touch control scanning signal at a touch control stage, and a common voltage signal at a display stage.

8. The array substrate according to claim 7, further including:
    a base substrate; and
    a common electrode switcher area arranged in the non-display area for disposing a plurality of signal switchers,
    wherein:
    a signal switch controls the common electrode to receive the touch control scanning signal at the display stage, and the common voltage signal at the touch control stage, and
    when being projected onto the base substrate of the array substrate, an orthogonal projection of the second portion of the second touch control electrode at least partially overlaps with an orthogonal projection of the electrostatic protection device area.

9. The array substrate according to claim 1, wherein:
    a ratio n between an area of any one of the plurality of second touch control electrodes to the area of the first touch control electrode is configured to be approximately $0.32<n<0.85$.

10. The array substrate according to claim 1, wherein:
    the second touch control electrode has a first edge disposed in the second non-display area;

the second non-display region has a first edge close to the display area and a second edge far away from the display area; and the first edge of the second touch control electrode is parallel to the second edge of the second non-display region.

11. A touch control display panel, comprising:
an array substrate, comprising:
a display area and a non-display area surrounding the display area, the non-display area including a first non-display area and a second non-display area;
a plurality of touch control electrodes comprising a plurality of first touch control electrodes and a plurality of second touch control electrodes,
wherein:
a first touch control electrode is disposed only in the display area,
the first non-display area is arranged along a first edge of the array substrate and close to the first touch control electrode,
a second touch control electrode includes a first portion disposed in the display area and a second portion disposed in the second non-display area,
the second non-display area is along a second edge of the array substrate,
a distance from a boundary line between the first non-display area and the display area to the first edge of the array substrate is a, a distance from a boundary line between the second non-display area and the display area to the second edge of the array substrate is b, and a<b, and
a ratio m between an area of the first portion of the second touch control electrode and an area of the first touch control electrode is configured to be approximately $0.067 \leq m \leq 0.65$; and
a plurality of touch control signal lines, wherein a touch control electrode is electrically connected to at least one of the plurality of touch control signal lines.

12. The touch control display panel according to claim 11, wherein:
an orthographic projection of the plurality of touch control signal lines on the array substrate is non-overlapped with one or more of the first non-display area and the second non-display area.

13. The touch control display panel according to claim 11, wherein the array substrate further includes:
a base substrate; and
a ground wire be disposed in the non-display area,
wherein when being projected onto the base substrate of the array substrate, an orthogonal projection of the ground wire is arranged between an edge of the array substrate and an orthogonal projection of the second touch control electrode.

14. The touch control display panel according to claim 11, wherein the array substrate further includes:
a base substrate; and
a ground wire be disposed in the non-display area,
wherein when being projected onto the base substrate of the array substrate, an orthogonal projection of the ground wire overlaps with an orthogonal projection of an edge of the second touch control electrode, and the edge of the second touch control electrode is in the non-display area.

15. The touch control display panel according to claim 11, wherein the array substrate further includes:
a base substrate; and
at least one shift register area arranged in the non-display area for disposing a plurality of shift registers disposed,
wherein when being projected onto the base substrate of the array substrate, an orthogonal projection of the second portion of the second touch control electrode at least partially overlaps with an orthogonal projection of the at least one shift register area.

16. The touch control display panel according to claim 11, wherein the array substrate further includes:
a base substrate; and
an electrostatic protection device area arranged in the non-display area for disposing a plurality of electrostatic protection devices,
wherein when being projected onto the base substrate of the array substrate, an orthogonal projection of the second portion of the second touch control electrode at least partially overlaps with an orthogonal projection of the electrostatic protection device area.

17. The touch control display panel according to claim 11, wherein the array substrate further includes:
a common electrode multiplex as the plurality of touch control electrodes,
wherein the common electrode receives a touch control scanning signal at a touch control stage, and a common voltage signal at a display stage.

18. The touch control display panel according to claim 17, wherein the array substrate further includes:
a base substrate; and
a common electrode switcher area arranged in the non-display area for disposing a plurality of signal switchers,
wherein:
a signal switch controls the common electrode to receive the touch control scanning signal at the display stage, and the common voltage signal at the touch control stage, and
when being projected onto the base substrate of the array substrate, an orthogonal projection of the second portion of the second touch control electrode at least partially overlaps with an orthogonal projection of the electrostatic protection device area.

19. The touch control display panel according to claim 11, wherein:
a ratio n between an area of any one of the plurality of second touch control electrodes to the area of the first touch control electrode is configured to be approximately $0.32<n<0.85$.

20. The touch control display panel according to claim 11, wherein:
the second touch control electrode has a first edge disposed in the second non-display area;
the second non-display region has a first edge close to the display area and a second edge far away from the display area; and
the first edge of the second touch control electrode is parallel to the second edge of the second non-display region.

* * * * *